United States Patent [19]
Christy

[11] Patent Number: 5,983,221
[45] Date of Patent: Nov. 9, 1999

[54] METHOD AND APPARATUS FOR IMPROVED DOCUMENT SEARCHING

[75] Inventor: Sam Christy, North Cambridge, Mass.

[73] Assignee: WordStream, Inc., Somerville, Mass.

[21] Appl. No.: 09/006,339

[22] Filed: Jan. 13, 1998

[51] Int. Cl.$^6$ .................................................. G06F 17/30
[52] U.S. Cl. .................................................. 707/5; 707/3
[58] Field of Search .................... 707/1, 5, 10, 100–104, 707/200–206; 704/9, 7, 270, 275, 277

[56] References Cited

U.S. PATENT DOCUMENTS

| | | | |
|---|---|---|---|
| 5,293,552 | 3/1994 | Aalbersberg ............................. | 707/5 |
| 5,488,725 | 1/1996 | Turtle et al. ............................. | 707/5 |
| 5,577,241 | 11/1996 | Spencer ..................................... | 707/5 |
| 5,659,732 | 8/1997 | Kirsch ....................................... | 707/5 |
| 5,826,260 | 10/1998 | Byrd, Jr. et al. ......................... | 707/5 |
| 5,864,848 | 1/1999 | Horvitz et al. ............................ | 707/6 |

OTHER PUBLICATIONS

Excerpt from *Survey of the State of the Art in Human Language Technology* (1997).

*Primary Examiner*—Ruay Lian Ho
*Attorney, Agent, or Firm*—Cesari and McKenna, LLP

[57] ABSTRACT

To facilitate accurate document searching, electronically accessible documents are provided with abstracts written in a highly constrained artificial grammar. The artificial grammar is capable of expressing the thoughts and information ordinarily conveyed in a natural grammar, but in a structured format that restricts the number of possible alternative meanings. Accordingly, while the grammar is clear in the sense of being easily understood by native speakers of the vocabulary and complex in its ability to express sophisticated concepts, sentences are derived from an organized vocabulary according to fixed rules. A query, preferably formulated in accordance with these rules, is employed by a search engine in the usual fashion. Due to the highly constrained meaning of the search query, and the likelihood that relevant documents have similar or matching abstracts in their headers, keyword searches are likely to identify the most relevant documents.

26 Claims, 3 Drawing Sheets

METHOD AND APPARATUS FOR IMPROVED DOCUMENT SEARCHING

BACKGROUND OF THE INVENTION

Prior to the proliferation of electronically available information over the Internet, computerized retrieval of information could be approached in a relatively organized fashion. Documents having widespread interest were typically maintained only by commercial database providers, which categorized them (by subject, date, etc.), and perhaps abstracted them, thereby facilitating multiple modes of searching. Consequently, a database user effectively narrowed the search space at the outset merely by choosing the appropriate database, which would limit the searchable documents to the topic of interest. Then, the user could retrieve documents from the selected database based on any of a variety of search criteria other than simple "key words": date of publication, contents of a category-specific document field, title or author, to name but a few.

While commercial database providers still exist, increasing amounts of information are stored on servers accessible over the Internet, which frequently make them available free of charge. Information on the Internet, of course, is both vast and utterly disorganized in the sense of lacking any hierarchical or category-based indexing scheme. Particular kinds of documents may be found on large numbers of servers, so that arbitrarily confining one's search to a single such server is likely to miss numerous relevant documents located elsewhere.

To allow Internet users to focus their searching efforts, several firms have created free-of-charge sites called "search engines." These systems maintain huge and constantly growing databases duplicating the text (or portions thereof) of thousands or even millions of documents accessible over the Internet, and permit "visitors" to the site to formulate queries that the search engine applies to its database. The search engine retrieves documents matching the query, often ranked in order of relevance (e.g., in terms of the frequency and location of word matches or some other statistical measure).

Unfortunately, the sheer volume of documents and their lack of organization, combined with the limited searching capabilities of most search engines, make it very likely that relevant documents will be missed or elude notice amidst a plethora of irrelevant retrievals. In order to guide these simple types of searches, the proprietors of documents available over the Internet frequently provide them with "headers" which, while invisible to someone retrieving the document, are nonetheless acquired by search engines and form part of the searchable text of the document. A document may, for example, repeat a key word over and over in its invisible header, thereby ensuring that matches to queries containing the key word will receive a high relevance rank (since each repetition in the header counts as a separate match).

Nonetheless, key-word searching remains limited, frequently resulting in missed entries (due to synonymous ways of expressing the relevant concept) or, even more frequently, a flood of irrelevant entries (due to the multiple unrelated meanings that may be associated with words and phrases). For example, someone interested in military activities in China might attempt to search using the query "troops in China." But because of the numerous and varied topics that may implicate virtually any chosen set of words, the search engine might retrieve documents containing the following sentences:

1. Bill Clinton plans meeting with leaders of China to talk about US troops in Taiwan.
2. Troops in Russia improve border security with China.
3. Leader of NATO troops in Bosnia to visit China.
4. Farmer finds crashed WWII troop carrier in southern China.
5. CIA papers reveal US troops in Cambodia near border of China during Vietnam War.
6. Asia expert, Johnson, talks to leaders of US troops about new weapons factories in China.
7. British troops in Hong Kong have mixed reaction to handover of Hong Kong to China.
8. Troops in controversy over design for new china.
9. Troops wear boots made in China.
10. Troops of General Chun put down protest in China.

Of course, only the last item is relevant to the user's intent.

SUMMARY OF THE INVENTION

In accordance with the present invention, electronically accessible documents are provided with abstracts written in a highly constrained artificial grammar. In addition, sentences are bracketed in the manner of an algebraic equation. The artificial grammar is capable of expressing the thoughts and information ordinarily conveyed in a natural grammar, but in a structured format that restricts the number of possible alternative meanings. Accordingly, while the grammar is clear in the sense of being easily understood by native speakers of the vocabulary and complex in its ability to express sophisticated concepts, sentences are derived from an organized vocabulary according to fixed rules. A query, preferably formulated in accordance with these rules, is employed by a search engine in the usual fashion. Due to the highly constrained meaning of such a search query and the existence of brackets, it is possible for a machine to determine an exact relationship between all of the words in the sentence. It is then possible to match the relationship of the words in a search query to the relationship of the words in a target of document, instead of simply relying on a general word match.

If relevant documents have in their headers abstracts containing similar word relationships, the query is readily used to identify the most relevant documents merely by examination of document headers. Furthermore, because the abstracts are contained within the invisible header portion of a document, their presence disturbs neither the appearance of the document nor the operation of ordinary search routines. In other words, the document header can contain an abstract in accordance with the invention as well as the usual key words, so that standard searches as well as the searches as described herein can coexist without mutual interference.

In order to constrain meaning, the vocabulary may be represented in a series of physically or logically distinct databases, each containing entries representing a form class as defined in the grammar. In this way, the user formulating a search query, or a document proprietor creating an abstract, is required to select from the allowed vocabulary. The databases are constructed to minimize the occurrence of synonymous terms, thereby reducing the chances of false-negative search results.

While desirable, however, vocabulary constraint is not critical to practice of the invention, since appreciable benefits are attained merely by use of the structured grammar and brackets (which themselves reduce query ambiguity significantly). Starting with a term from one of four form classes, sentences are constructed by iterative application of four expansion rules that govern the manner in which terms from the various classes can be combined. The invention exploits the relative ease of learning a new grammar, particularly one that is highly constrained to a few precise rules, as compared with learning a new vocabulary. As a result, after becoming familiar with this grammar, the user can easily compose sentences in the manner prescribed by the present invention.

To compose an abstract or query, a sentence is formulated ab initio in accordance with the form classes or expansion rules, or a natural-language sentence is translated or decomposed into the (typically) simpler grammar of the invention but preserving the original vocabulary.

In accordance with the invention, sentences are composed of "linguistic units," each of which may be one or a few words, from the allowed form classes. These classes are "things" or nominal terms that connote, for example, people, places, items, activities or ideas; "connectors" that specify relationships between two (or more) nominal terms; "descriptors" modifying the state of one or more nominal terms; and "logical connectors" establishing sets of the nominal terms. If the invention is to be used with a constrained vocabulary, the list of all allowed entries in all four classes represents the global lexicon of the invention. To construct a sentence in accordance with the invention, entries from the form classes are combined according to four expansion rules detailed below. These rules can be followed explicitly in a stepwise fashion to produce sentences, but more typically, once the user is accustomed to the grammar, sentences are constructed by "feel" and, if necessary, subsequently tested for conformity with the expansion rules.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
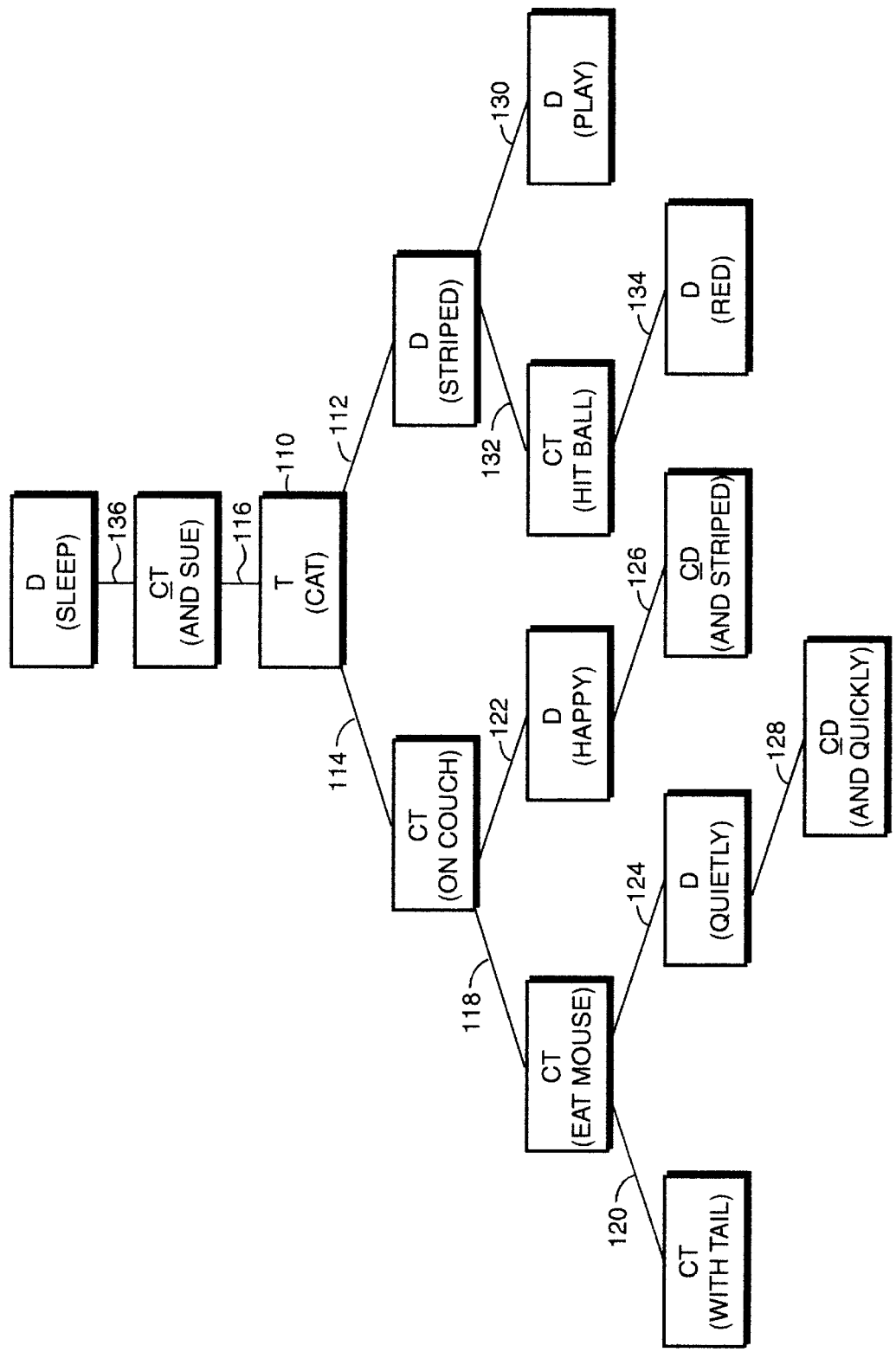
FIG. 1 schematically illustrates application of the expansion rules of the present invention.

The grammar of the present invention makes use of a lexicon and a constrained set of rules. The rules divide the allowed vocabulary—i.e., the entire English language treated as linguistic units or a subset thereof, either of which represents a global lexicon of linguistic units—into four classes. Each linguistic unit is (1) a single word, such as "dog" or "government"; or (2) a hyphenated combination of words, such as "parking-space" or "prime-minister"; or (3) a proper name; or (4) a word with a definition unique to the invention; or (5) one form of a word with multiple meanings. In the latter case, each definition of the word represents a different linguistic unit, the various definitions may appear as entries in different form classes. For purposes of automation, each definition may be distinguished, for example, by the number of periods appearing at the end of the word. The entry for the first (arbitrarily designated) definition is listed with no period, the entry representing the second definition is listed with one period at its end, and so on. Alternatively, different word senses can be identified numerically, e.g., using subscripts.

Words unique to the invention may make up a very small proportion of the total lexicon, and none of these words is specific to the invention or alien to the natural language upon which it is based. Instead, invention-specific words are broadened in connotation to limit the overall number of terms in the lexicon. For example, in a preferred implementation, the word "use" is broadened to connote employment of any object for its primary intended purpose, so that in the sentence "Jake use book," the term connotes reading. The word "on" may be used to connote time (e.g., (i go-to ballgame) on yesterday). If desired for ease of use, however, the invention-specific words can be eliminated altogether and the lexicon expanded accordingly.

The invention divides the global lexicon of allowed terms into four classes: "things" or nominal terms that connote, for example, people, places, items, activities or ideas, identified herein by the code T; "connectors" that specify relationships between two (or more) nominal terms (including words typically described as prepositions and conjunctions, and terms describing relationships in terms of action, being, or states of being), identified herein by C; "descriptors" modifying the state of one or more nominal terms (including words typically described as adjectives, adverbs and intransitive verbs), identified herein by D; and "logical connectors" establishing sets of the nominal terms, identified herein by $\underline{C}$. Exemplary constrained lists of nominal terms, connectors and descriptors are set forth in Appendices 1–3, respectively. The preferred logical connectors are "and" and "or".

Preferably, verb tenses are not employed, since these tend to create more ambiguity than they resolve; connectors are phrased in the present tense, since tense is easily understood from context. Tense may nonetheless be indicated, however, by specifying a time, day and/or date. Alternatively, if tense is considered important, it may be indicated by symbolic signals such as "/" for past, "|" for present, and "\" for future. It should be noted, however, that some natural languages do not utilize tense indicators.

Sentences in accordance with the invention are constructed from terms in the lexicon according to four expansion rules. The most basic sentences proceed from one of the following three constructions (any of which can be created from a T term in accordance with the expansion rules set forth hereinbelow). These structures, which represent the smallest possible sets of words considered to carry information, are the building blocks of more complex sentences. Their structural simplicity facilitates ready translation into conversational, natural-language sentences; thus, even complex sentences in accordance with the invention are easily transformed into natural-language equivalents through modular analysis of the more basic sentence components (a process facilitated by the preferred representations described later).

Basic Structure 1 (BS1) is formed by placing a descriptor after a nominal term to form the structure TD. BS1 sentences such as "dog brown" and "Bill swim" readily translate into the English sentence "the dog is brown" (or the phrase "the brown dog") and "Bill swims."

BS2 is formed by placing a connector between two nominal terms to form the structure TCT. BS2 sentences such as "dog eat food" readily translate into English equivalents.

A sentence comprising one or more of the basic structures set forth above may be expanded using the following rules:

Rule I: To a nominal term, add a descriptor (T→TD)

In accordance with Rule I, any linguistic unit from the nominal class can be expanded into the original item followed by a new item from the descriptor class, which modifies the original item. For example, "dog" becomes "dog big." Like all rules of the invention, Rule I is not limited in its application to an isolated nominal term (although this is how BS1 sentences are formed); instead, it can be applied to any nominal term regardless of location within a larger sentence. Thus, in accordance with Rule I, $TD_1 \rightarrow (TD_2)D_1$. For example, "dog big" becomes "(dog brown) big" (corresponding to English sentence, "the brown dog is big").

The order of addition may or may not be important in the case of consecutive adjectives, since these independently modify T; for example, in "(dog big) brown," the adjective "big" distinguishes this dog from other dogs, and "brown" may describe a feature thought to be otherwise unknown to the listener. The order of addition is almost always important where a D term is an intransitive verb. For example, expanding the TD sentence "dog run" (corresponding to "the dog runs" or "the running dog") by addition of the descriptor "fast" forms, in accordance with Rule I, "(dog fast) run" (corresponding to "the fast dog runs"). To express "the dog runs fast," it is necessary to expand the TD sentence "dog fast" with the descriptor "run" in the form "(dog run) fast."

Applying expansion Rule I to the structure BS2 produces TCT→(TD)CT. For example, "dog eat food" becomes "(dog big) eat food." Rule I can also be applied to compound nominal terms of the form TCT, so that a structure of form TCT becomes TCT→(TCT)D. For example, "mother and father" becomes "(mother and father) drive." In this way, multiple nominal terms can be combined, either conjunctively or alternatively, for purposes of modification. It should also be noted that verbs having transitive senses, such as "drive," are included in the database as connectors as well as descriptors. Another example is the verb "capsize," which can be intransitive ("boat capsize") as well as transitive ("captain capsize boat").

Rule IIa: To a nominal term, add a connector and another nominal term (T→TCT).

In accordance with Rule IIa, any linguistic unit from the nominal class can be replaced with a connector surrounded by two nominal entries, one of Is which is the original linguistic unit. For example, "house" becomes "house on hill." Applying expansion Rule IIa to BS1 produces TD→(TCT)D; for example, "gloomy house" becomes "(house on hill) gloomy," or "the house on the hill is gloomy."

Rule IIa can be used to add a transitive verb and its object. For example, the compound term "mother and father" can be expanded to "(mother and father) drive car."

Rule IIb: To a nominal term, add a logical connector and another nominal term (T→TCT).

In accordance with Rule IIb, any linguistic unit from the nominal class can be replaced with a connector surrounded by two nominal entries, one of which is the original linguistic unit. For example, "dog" becomes "dog and cat."

Again, for purposes of Rule IIa and Rule IIb, a nominal term can be a composite consisting of two or more nominal terms joined by a connector. For example, the expansion "(john and bill) go-to market" satisfies Rule IIa. Subsequently applying Rule I, this sentence can be further expanded to "((john and bill) go-to market) together.

Rule III: To a descriptor, add a logical connector and another descriptor (D→DCD).

In accordance with Rule III, a descriptor can be replaced with a logical connector surrounded by two descriptors, one of which is the original. For example, "big" becomes "big and brown." Applying expansion Rule III to BS1 produces TD→T(DCD); for example "dog big" (equivalent to "the dog is big," or "the big dog") becomes "dog (big and brown)" (equivalent to "the dog is big and brown" or "the big brown dog").

The manner in which these rules are applied to form acceptable sentences in accordance with the invention is shown in FIG. 1. Beginning with a nominal term such as cat, shown at 110, any of the three basic structures can be formed by following expansion Rules I, IIa and IIb as shown at 112, 114, 116, respectively, to produce "cat striped" (BS1), "cat on couch" (BS2) or "cat and Sue." Iterative application of expansion rule IIa at 118 and 119 produces structures of the forms $TC_1T_1 \rightarrow (TC_1T_1)C_2T_2$ or "((cat on couch) eat mouse)" and $(TC_1T_1)C_2T_2 \rightarrow ((TC_1T_1)C_2T_2)C_3T_3$ or "(((cat on couch) eat mouse) with tail)." Expansion rule I can be applied at any point to a T linguistic unit as shown at 122 (to modify the original T, cat, to produce "(happy cat) on couch") and 124 (to modify "eat mouse"). Rule III can also is be applied as shown at 126 (to further modify cat to produce "(((happy and striped) cat) on couch)") and 128 (to further modify "eat mouse").

Expansion Rule I can be applied iteratively as shown at 112, 130 to further modify the original T (although, as emphasized at 130, a descriptor need not be an adjective). Expansion Rule IIa is available to show action of the modified T (as shown at 132), and Rule I can be used to modify the newly introduced T (as shown at 134). Rule I can also be used to modify (in the broad sense of the invention) a compound subject formed by Rule IIb, as shown at 136.

The order in which linguistic units are assembled can strongly affect meaning. For example, the expansion $TC_1T_1 \rightarrow (TC_1T_1)C_2T_2$ can take multiple forms. The construct "cat hit (ball on couch)" conveys a meaning different from "cat hit ball (on couch)." In the former the ball is definitely on the couch, and in the latter the action is taking place on the couch. The sentence "(john want car) fast" indicates that the action should be accomplished quickly, while "(john want (car fast))" means that the car should move quickly.

This approach substantially reduces ambiguity. Returning to an earlier example, the 10 retrieved sentences containing the words "troops in China" are shown in English (E) and in accordance with their representation as prescribed herein (I):

1E. Bill Clinton plans meeting with leaders of China to talk about US troops in Taiwan.

1I. Bill Clinton plan ((he meet-with (leader/s of China)) in-order-to (he talk-about (troops of United-States) in Taiwan)).

2E. Troops in Russia improve border security with China.

2I. (Troops in Russia) improve ((security of border) with China).

3E. Leader of NATO troops in Bosnia to visit China.

3I. (Leader of ((troops of NATO)in Bosnia)) visit China.

4E. Farmer finds crashed WWII troop carrier in southern China.

4I. (Farmer find (troop-carrier from WWII)) in (China southern). (Troop-carrier crash) during WWII.

5E. CIA papers reveal US troops in Cambodia near border of China during Vietnam War.

5I. (Paper/s of CIA) reveal (((troop/s of united-states) in Cambodia) near (border of China)) during Vietnam-War.

6E. Asia expert, Johnson, talks to leaders of US troops about new weapons factories in China.

6I. Johnson be (expert about Asia). He talk-to (leader/s of (troop/s of united-states)) about (((factory/s for weapon/s) new ) in China.)

7E. British troops in Hong Kong have mixed reaction to handover of Hong Kong to China.

7I. (Reaction of ((troops of Britain) in Hong-Kong)) about ((handover of Hong-Kong) to China) mixed.

8E. Troops in controversy over design for new china.

8I. (Troop/s have controversy) about (design of (china new)).

9E. Troops wear boots made in China.

9I. Troops wear (boot/s made-in China).

10E. Troops of General Chun put down protest in China.

10I. ((Troops of General-Chun) put-down protest) in China.

The query "troops in China"—which is an acceptable formulation in accordance with the grammar of the invention—would retrieve the last entry (101) as the most relevant, since only sentence 101 contains the information unit "troops in China" or a one-to-one underlying grammatical relationship between the words in the query and the words in the sentence.

Queries are processed according to a routine that extracts "information units" in sentences constructed according to the invention. For example, in the sentence, ((Clinton visit (aircraft-carrier in persian-gulf)) on jan-97)

the routine would identify the following information units:

1. aircraft-carrier in persian-gulf
2. clinton visit aircraft-carrier
3. clinton visit aircraft-carrier in persian-gulf
4. aircraft-carrier on jan-97
5. aircraft-carrier in persian-gulf on jan-97
6. clinton on jan-97
7. clinton visit aircraft-carrier on jan-97
8. clinton visit aircraft-carrier in persian-gulf on jan-97

The information units represent the most basic elements of information content in the sentence, as well as their combinations. Thus, the sentence would be meaningful for a searcher looking not only for information specifically concerning President Clinton's visit to an aircraft carrier in the Persian Gulf in January 1997. A searcher might, for example, be interested generally in the president's itinerary for January 1997, or events in the Persian Gulf at this time.

Information units are extracted according to the following method:

1. Start with sentence S, e.g., (I like ((house on hill) near beach))
2. Locate first occuring complete info unit, (TCT) or (TD); e.g., in sentence S, this is (house on hill)
3. If this sentence does not contain a variable then identify "house on hill" as information unit
4. Replace information unit with a variable, e.g., (I like (% near beach))
5. Repeat step 2, e.g., (% near beach)
6. If this sentence does contain a variable then remove first word from first printed sentence and replace for variable and identify "house near beach" as information unit; replace variable with entire first sentence and identify as information unit "house on hill near beach"; repeat this process with all sentences that existed prior to the beginning of step 6.
7. Repeat from step 2, e.g., (I like %); identify the following information units: "I like house," "I like house on hill," "I like house," "I like house near beach," "I like house," "I like house on hill near beach"
8. If step 2 produces empty brackets than remove all duplicate sentences from identified information units
9. End processing when sentence S is empty. If sentence S is not empty, than repeat method until step 2 finds unit with two variables (% C %). Repeat steps 4–7 on both variables. Repeat method until sentence S is empty.

The results of this processing are the following information units:

1. house on hill
2. house near beach
3. house on hill near beach
4. I like house
5. I like house on hill
6. I like house
7. I like house near beach
8. I like house
9. I like house on hill near beach A suitable computer program for implementing the foregoing procedure is as follows:

```
Public Sub subPullUnit()
Dim varLeft As Variant
Dim varRight As Variant
Dim varTarget As Variant
Dim intCount As Integer
Dim intCount2 As Integer
Dim intHolderl As Integer
Dim intHolder2 As Integer
    varLeft = Left(varInput, InStr(varInput, ")"))
    varRight = Trim(Right(varInput, Len(varInput) - InStr(varInput, ")")))
    varTarget = varLeft
    For intCount = 1 To 10
        If InStr(varTarget, "(") = 0 Then Exit For
        varTarget = Right(varTarget, Len(varTarget) - InStr(varTarget, "("))
    Next intCount
    varLeft = Trim(Left(varLeft, Len(varLeft) - Len(varTarget) - 1))
    varTarget = Trim(Left(varTarget, Len(varTarget) - 1))
    varInput = varLeft & ":1:"& varRight
    intHolder1 = frmpage.lstHolder1.ListCount
    intHolder2 = frmPage.lstHolder2.ListCount
    Select Case InStr(varTarget, ":1:")
        Case Is = 0
            frmPage.1stHolder1.AddItem varTarget
        Case Is = 1
            If InStr(Right(varTarget, Len(varTarget) - 3), ":1:") <> 0 Then
```

```
                    varTarget = Right(varTarget, Len(varTarget) −3)
                    varTarget = Left(varTarget, Len(varTarget) − 3)
                    With frmPage.1stHolder1
                        For intCount = 0 To intHolder2 − 1
                            For intCount2 =0 To intHolder1 − 1
                            frmPage.1stHolder2.AddItem__
                            Left(frmPage.1stHolder2.List(intCount),
InStr(frmPage.1stHolder2.List(intCount), " "))__
                            & varTarget & __
                            Left(.List(intCount2), InStr(.List(intCount2), " "))
                            'RIGHT WORD AND LEFT WORD
                            frmPage.1stHolder2.AddItem__
                            Left(frmPage.1stHolder2.List(intCount),
InStr(frmPage.1stHolder2.List(intCount), " "))__
                            & varTarget & __
                            .List(intCount2)
                            'RIGHT WORD AND LEFT PHRASE
                            frmPage.1stHolder2.AddItem__
                            frmPage.1stHolder2.List(intCount)_
                            & varTarget & __
                            Left(.List(intCount2), InStr(.List(intCount2)," "))
                            'RIGHT PHRASE AND LEFT WORD
                            frmPage.1stHolder2.AddItem__
                            frmPage.1stHolder2.List(intCount)__
                            & varTarget & __
                            .List(intCount2)
                            'RIGHT PHRASE AND LFFT PHRASE
                            Next intCount2
                        Next intCount
                    End With
                    'MsgBox varInput
                    'For intCount = 0 To frmPage.1stHolder1.ListCount − 1
                    intHolder1 = frmPage.1stHolder1.ListCount
                    For intCount = 0 To intHolder1 −1
                        frmPage.1stHolder3.AddItem frmPage.1stHolder1.List(intCount)
                    Next intCount
                    frmPage.1stHolder1.Clear
                    For intCount = 0 To frmPage.1stHolder2.Listcount − 1
                        frmPage.1stHolder1.AddItem frmPage.1stHolder2.List(intCount)
                    Next intCount
                    frmPage.1stHolder2.Clear
                Else
                    varTarget = Right(varTarget, Len(varTarget) = 3)
                    With frmPage.1stHolder1
                        For intCount = 0 To intHolder1 − 1
                        .AddItem Left(.List(intCount), InStr(.List(intCount), " "))__
                        & varTarget
                        .AddItem.List(intCount) & varTarget
                        Next intCount
                    End With
                End If
            Case Else
                varTarget = Left(varTarget, Len(varTarget) − 3)
                With frmPage.1stHolder1
                    For intCount = 0 To intHolder1 − 1
                    .AddItem varTarget & _
                    Left(.List(intCount), InStr(.List(intCount), " "))
                    .AddItem varTarget & .List(intCount)
                    Next intCount
                End With
        End Select
            'If InStr(varInput, ":1:") = 3 And
            IfInStr(varInput, ":1:") <> 0 And__
            (InStr(Right(varInput, Len(varInput) − 5), ")") >__
            InStr(Right(varInput, Len(varInput) − 5), "(")) And__
            InStr(Right(varInput, Len(varInput) − 5), ":1:") = 0 And__
            InStr(Right(varInput, Len(varInput) − 5), "(") <> 0 Then
            For intCount = 0 To frmPage.1stHolder1.ListCount − 1
                frmPage.1stHolder2.AddItem frmPage.1stHolder1.List(intCount)
            Next intCount
            frmPage.1stHolder1.Clear
            End If
    IfInStr(varInput, ")") <> 0 Then Call subPullUnit
    For intCount = 0 To frmPage.1stHolder3.ListCount − 1
        frmPage.1stShow.AddItem frmPage.1stHolder3.List(intCount)
    Next intCount
    For intCount = 0 To frmPage.1stHolder1.ListCount − 1
        frmPage.1stShow.AddItem frmPage.1stHolder1.List(intCount)
    Next intCount
    With frmPage.1stShow
```

-continued

```
For intCount = 0 To .ListCount
    For intCount2 = intCount + 1 To .ListCount
        If .List(intCount) = .List(intCount2) Then
            intCount2 = intCount2 - 1
            .RemoveItem (intCount2)
        Else
            Exit For
        End If
    Next intCount2
Next intCount
End With
End Sub
```

"Things" in the first place of a set generally act as subjects, while "things" in the end place of a set generally act as objects; e.g., in the sentence (cat hit dog), "cat" is the primary Thing or subject, and "dog" is the secondary "Thing." Accordingly, in the sentence ((cat with hat)see dog) the routine does not produce the information unit "hat see dog," but does produce the information unit "cat see dog."

Similarly, consider the two sentences ((((Ship American) with (radar new)) shoot-down airplane) in persian-gulf
and
(Ship see (helicopter shoot-down airplane))

In this case, while both sentences contain the same three words "ship," "shoot-down," and "airplane" in the same order, only the first sentence is actually about a ship that shoots down an airplane.

Although the invention is suitably practiced in any system calling for electronic retrieval of documents from a large database (or multiple data-bases), it is especially useful in conjunction with the Internet, which affords even a personal computer access to tremendous numbers of other and potentially far larger computers. Much of the Internet is based on the client-server model of information exchange. This computer architecture, developed specifically to accommodate the "distributed computing" environment that characterizes the Internet and its component networks, contemplates a server (sometimes called the host)—typically a powerful computer or cluster of computers that behaves as a single computer—that services the requests of a large number of smaller computers, or clients, which connect to it. The client computers usually communicate with a single server at any one time, although they can communicate with one another via the server or can use the server to reach other servers. A server is typically a large mainframe or minicomputer cluster, while the clients may be simple personal computers. Servers providing Internet access to multiple subscriber clients are referred to as "gateways"; more generally, a gateway is a computer system that connects two computer networks.

The Internet supports a large variety of information-transfer protocols. One of these, the World Wide Web (hereafter, simply, the "web"), has recently skyrocketed in importance and popularity; indeed, to many, the Internet is synonymous with the web. Web-accessible information is identified by a uniform resource locator or "URL," which specifies the location of the file in terms of a specific computer and a location on that computer. Any Internet "node" can access the file by invoking the proper communication protocol and specifying the URL. Typically, a URL has the format http://<host>/<path>, where "http" refers to the HyperText Transfer Protocol, "host" is the server's Internet identifier, and the "path" specifies the location of the file within the server. Each "web site" can make available one or more web "pages" or documents, which are formatted, tree-structured repositories of information, such as text, images, sounds and animations.

An important feature of the web is the ability to connect one document to many other documents using "hypertext" links. A link appears unobtrusively as an underlined portion of text in a document; when the viewer of this document moves his cursor over the underlined text and clicks, the link—which is otherwise invisible to the user—is executed and the linked document retrieved. That document need not be located on the same server as the original document.

Hypertext and document-retrieval functionality is typically implemented on the client machine, using a computer program called a "web browser." With the client connected as an Internet node, the browser, operating as a process on the client machine, utilizes URLs—provided either by the user or a link—to locate, fetch and display the specified documents. The browser passes the URL to a protocol handler on the associated server, which then retrieves the information and sends it to the browser for display; the browser causes the information to be cached (usually on a hard disk) on the client machine.

Figure 2:
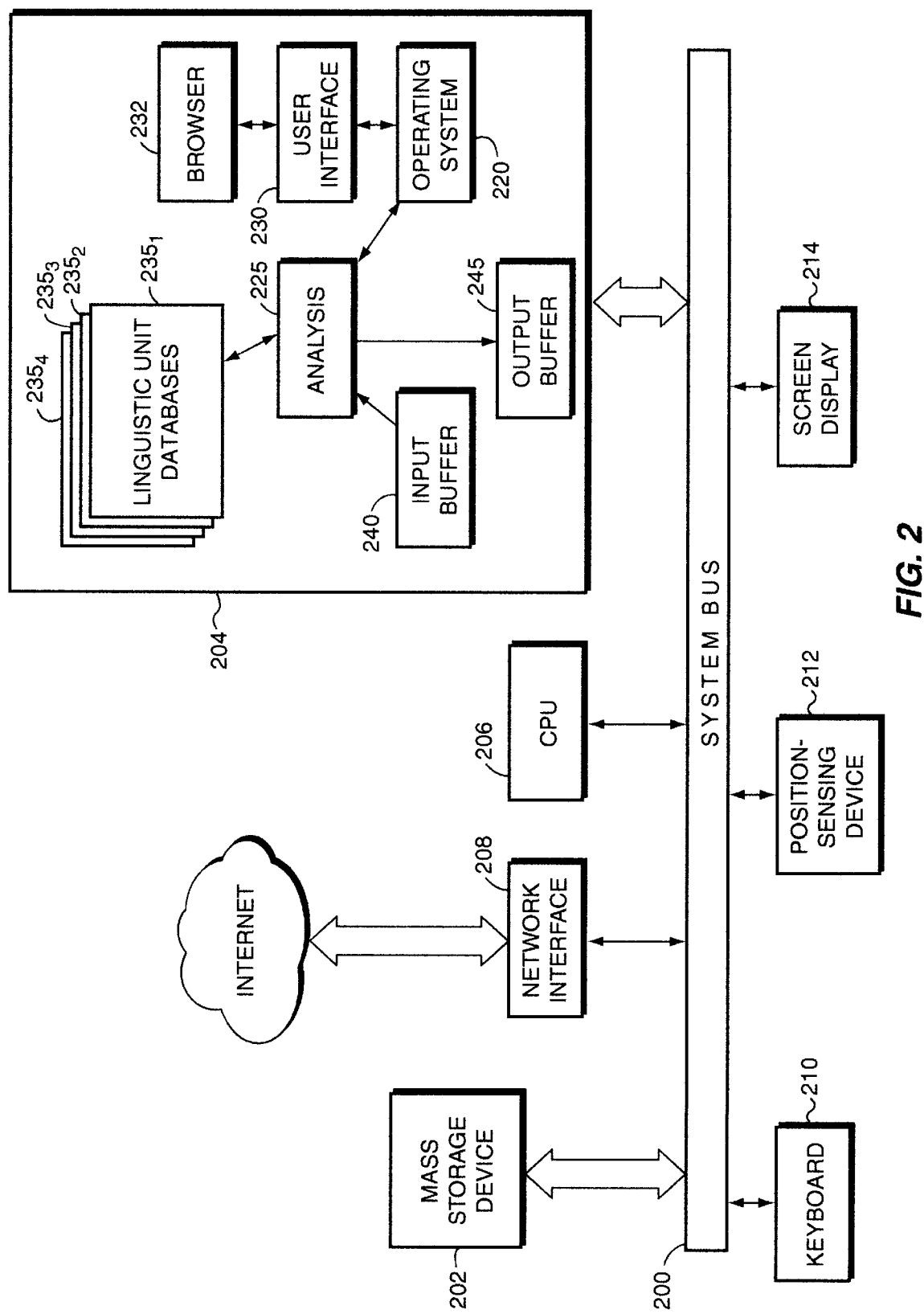
FIG. 2 is a schematic representation of a hardware system embodying the invention.

A representative client machine implementing the present invention is shown in FIG. 2. As indicated therein, the system includes a main bidirectional bus 200, over which all system components communicate. The main sequence of instructions effectuating the functions of the invention and facilitating interaction among the user, the system, and the Internet, reside on a mass storage device (such as a hard disk or optical storage unit) 202 as well as in a main system memory 204 during operation. Execution of these instructions and effectuation of the functions of the invention is accomplished by a central-processing unit ("CPU") 206. A network interface 208 connects, generally via telephone dial-up, to a gateway or other Internet access provider. As a result the client machine becomes a node on the Internet, capable of exchanging data with other Internet computers.

The user interacts with the system using a keyboard 210 and a position-sensing device (e.g., a mouse) 212. The output of either device can be used to designate information or select particular areas of a screen display 214 to direct functions to be performed by the system.

The main memory 204 contains a group of modules that control the operation of CPU 206 and its interaction with the other hardware components. An operating system 220 directs the execution of low-level, basic system functions such as memory allocation, file management, and operation of mass storage devices 202. At a higher level, an analysis module 225, implemented as a series of stored instructions, may be included to assist the user in developing queries, or to detect queries that do not accord with the above-described rules (or which fall outside the global lexicon). Instructions defining a user interface 230 allow straightforward interaction over screen display 214. User interface 230 provides functionality for generating words or graphical images on display 214 to prompt action by the user, and for accepting user commands from keyboard 210 and/or position-sensing device 212. A web browser 232 facilitates interaction with the web via network interface 208. Browser 232 may be integrated with user interface 230, deriving therefrom the functionality necessary for interaction with the user. Suitable browsers are well known and readily available; these include the EXPLORER browser marketed by Microsoft Corp., and the COMMUNICATOR and NAVIGATOR products supplied by Netscape Communications Corp.

To support analysis module 225 (if included), main memory 204 may also include a partition defining a series of databases capable of storing the linguistic units of the invention; these are representatively denoted by reference numerals $235_1, 235_2, 235_3, 235_4$. Databases 235, which may be physically distinct (i.e., stored in different memory partitions and as separate files on storage device 202 ) or logically distinct (i.e., stored in a single memory partition as a structured list that may be addressed as a plurality of data-bases), each contain all of the linguistic units corresponding to a particular class. In other words, each database is organized as a table each of whose columns lists all of the linguistic units of the particular class. Nominal terms may be contained in database $235_1$, and a representative example of the contents of that database appears in Appendix 1 hereto; connectors may be contained in database $235_2$, a representative example of which appears in Appendix 2 hereto; descriptors may be contained in database $235_3$, a representative example of which appears in Appendix 3 hereto; and logical connectors (most simply, "and" and "or") are contained in database $235_4$. The appendices may simply contain lists of linguistic units, but are preferably formatted in three columns—the first containing the linguistic unit, the second containing a definition (if the linguistic unit has more than one meaning and is therefore replicated in the database), and the third containing a synonyms.

An input buffer 240 receives from the user, via keyboard 210, an input sentence. Analysis module 225 examines the input sentence for conformance to the structure, and makes corrections as necessary. Analysis module 225 enters a proposed sentence revision (or the unmodified sentence, if no changes were necessary) into an output buffer 245, the contents of which are presented to the user over screen display 214 (e.g., as a pop-up window in the browser display). The user is free to accept the revision or revise it; in the latter case, analysis module 225 once again reviews the sentence for conformance to the above-described rules, and enters the approved sentence or a proposed revision into output buffer 245.

If the appendices include definitions and synonyms, analysis module 225 first determines whether whether each linguistic unit has more than one meaning (i.e., definition). If so, the user is prompted (via screen display 214 ) to choose the entry with the intended meaning. If a linguistic unit has one or more associated synonyms, these are offered to the user as alternatives. Furthermore, if the a synonym is linked to more than one linguistic unit, all of these are offered as alternatives.

It must be understood that although the modules of main memory 204 have been described separately, this is for clarity of presentation only; so long as the system performs all necessary functions, it is immaterial how they are distributed within the system and the programming architecture thereof.

Figure 3:
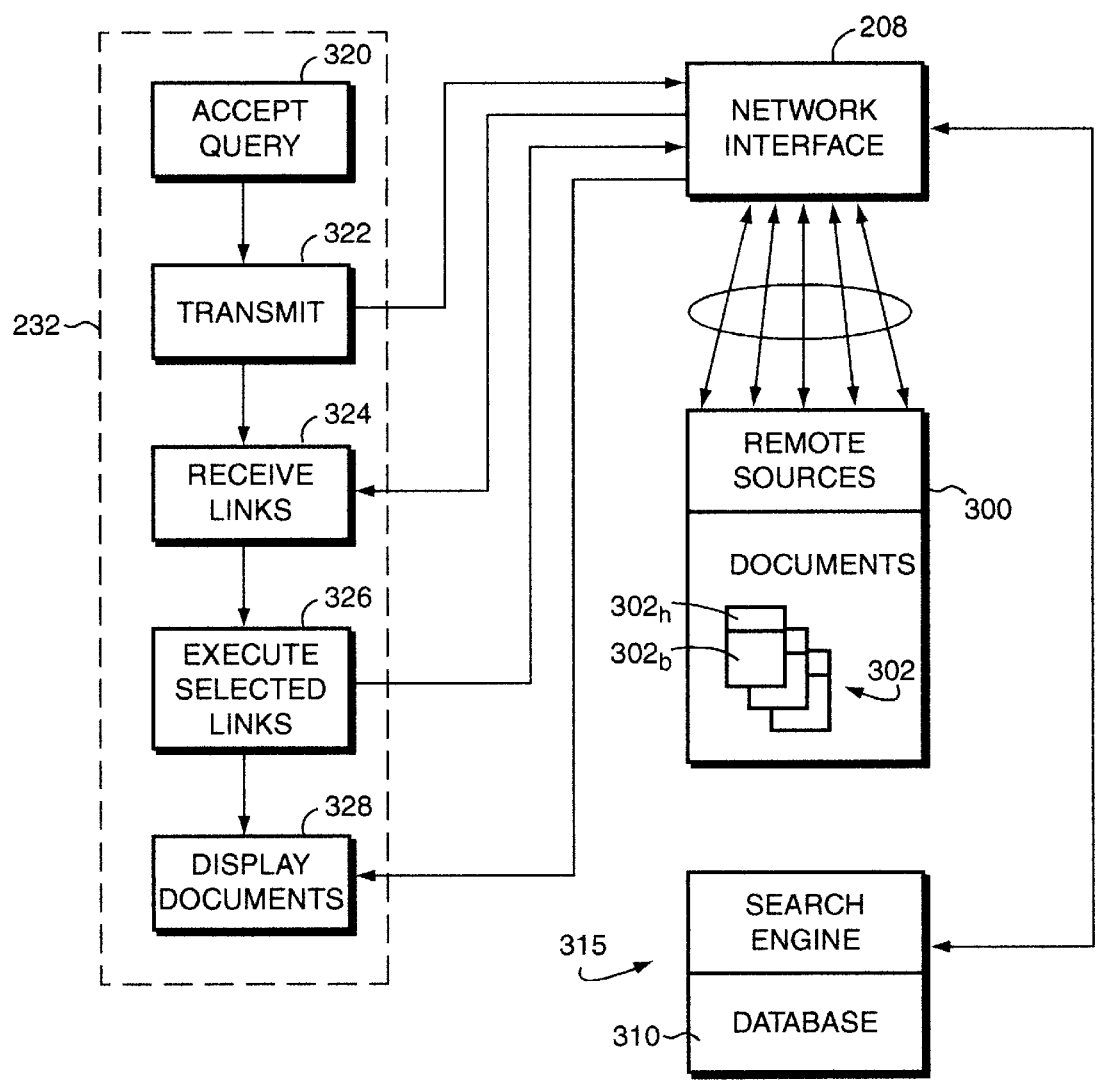
FIG. 3 schematically illustrates operation of the invention.

Operation of the invention may be understood with reference to FIG. 3. The browser 232 is capable of establishing connection, via network interface 208, to one or more remote sources 300. These sources are servers containing one or more web pages that include text and rendering instructions. When a web page is downloaded by browser 232 (via network interface 208 ), it is cached, and browser 232 executes the rendering instructions to create on screen 214 a display that includes the text, as well as graphical and/or image portions, of the web page. Each web page may be stored on remote source 300 as a document containing a body portion $302_b$ and a header portion $302_h$. Only the body portion $302_b$ is actually visible when the web page is "visited"—that is, downloaded onto the client computer (usually accompanied by further interaction with the server).

Web pages are stored as a database 310 on a search engine 315, i.e., a specialized server computer equipped to apply to database 310 queries received from connected client computers. Typically, the entire textual portion of each stored web page appears in database 310. Although only the body portion $302_b$ $_{of}$ a document will actually appear on the display of web browser 232, both header and body portions are searchable by key word. Search engine 315 applies a client-originated query to database 310 and generates a report listing the web pages matching the search criteria. The various search engines differ in their operating characteristics, but generally the results of the search appear as list of hypertext links to the identified web pages, each link being accompanied by a portion of the text.

In general operation, browser 232 performs a sequence of steps that is initiated by the user's acceptance of the query in output buffer 245, shown as a step 320. Browser 232 then transmits the query (step 322 ), via network interface 208, to a search engine 315 with which the client computer has established an Internet connection. The search engine 315 applies the query to its database 310 (preferably in accordance with the query-processing routine described above), identifying relevant web pages, and returning a list of hypertext links thereto. Generally, the list is ranked hierarchically to reflect both the absolute number of word or information-unit matches between the query and the listed documents as well as other factors suggesting relevance; for example, a document in which word order is preserved or the query terms are found in close proximity to one another may be ranked higher than another document with the same number of word matches but where the words are separated or scattered. The invention is capable of extending its search to a desired level of estimated relevance, ordering the retrieved documents according to relevance criteria.

The list of documents is received by browser 232 in step 324. The client user may operate browser 232 to execute selected ones of the returned links in step 326, resulting in download and display of the linked web pages in step 328.

In accordance with the invention, the headers $302_h$ of documents 302 each contain both key words descriptive of the contents of the web page and an abstract, composed in accordance with the grammar hereinabove described, which also describes the subject matter. In formulating a query, the user is free to enter a conventional series of key words or a sentence formulated according to the grammar rules hereof. Search engine 315 may prompt the user to designate whether the query is structured or unstructured, or may simply infer this from the query itself, or may instead simply search for is matches regardless of the query format. If the query is identified as structured, search engine 315 may apply the search only to the structured portions of web-page headers $302_h$. Indeed, due to the utility of the invention's grammar in making meaning explicit, the user may elect to apply even an unstructured search only to the structured portions of the web-page headers.

Because of the importance of the order and organization of words in a structured query, search engine 315, when performing a search in accordance with the invention, is configured for sensitivity to word order and proximity. Word order is always preserved in all information units extracted from a sentence.

Ranking can be achieved by emphasizing units extracted from the sentence without word separation. The distance between matched words can also be used as a ranking factor, as can differences in the hierarchical (bracketing) level at which a match occurs. For example, absolute literal matches are weighted more highly than matches where the word order differs from that of the query, or where the identified query words are scattered within the document. Accordingly, in the example discussed above, entry 10 would be selected over the other entries even if these contained a larger absolute number of word matches.

It will therefore be seen that the foregoing represents readily implemented and exploited approach to improving the reliability of text-based searches. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, the various modules of the invention can be implemented on a general-purpose computer using appropriate software instructions, or as hardware circuits, or as mixed hardware-software combinations.

I claim:

1. A method of facilitating searches of electronically stored documents in a text-searchable database, the method comprising the steps of:

a. electronically storing, with respect to each document, at least one text-searchable abstract descriptive of a document subject, the abstract comprising a series of words generated by selecting a nominal item and expanding the abstract by iteratively applying at least one of a set of rules comprising:
      i. to a nominal item, add a descriptor describing the nominal item;
      ii. to a nominal item, add a connector item and another nominal item, connector items specifying relationships between at least two nominal items;
      iii. to a nominal item, add a logical connector and another nominal item, logical connectors establishing sets of nominal items; and
      iv. to a descriptor item, add a logical connector and another descriptor item;
   b. receiving a user query comprising a series of words;
   c. applying the query to the document abstracts to identify word matches therebetween;
   d. identifying stored documents having abstracts with words matching at least some of the words of the query; and
   e. based on word matches, ranking the identified documents in an order relevance, the order favoring documents having abstracts with terms literally matching the query.

2. The method of claim 1 wherein each iteration of the rules is identified by enclosure within parentheses.

3. The method of claim 1 further comprising the step of structuring the query according to the set of rules.

4. The method of claim 1 further comprising the step of providing data-bases of nominal, connector, descriptor and logical-connector items, the words of the abstract being selected from the databases.

5. The method of claim 4 wherein the words of the user query are also selected from the databases.

6. The method of claim 4 wherein the logical-connector database comprises the entries and, or.

7. The method of claim 1 wherein the documents comprise viewable and non-viewable portions, the abstracts being contained in the non-viewable portions.

8. The method of claim 1 further comprising the step of facilitating user retrieval of the identified documents.

9. The method of claim 1 wherein the nominal items name a person, place, thing, activity or idea.

10. The method of claim 9 wherein the nominal items include the terms set forth in Appendix 1.

11. The method of claim 1 wherein the connector items show action, being or state of being.

12. The method of claim 11 wherein the connector items include the terms set forth in Appendix 2.

13. The method of claim 1 wherein the descriptor items describe a quality, quantity, state or type of a nominal entry.

14. The method of claim 13 wherein the descriptor items include the entries set forth in Appendix 3.

15. Apparatus for facilitating searches of electronically stored documents, the apparatus comprising:

a. a database of electronically stored documents, the database comprising, with respect to each document, at least one text-searchable abstract descriptive of a document subject, the abstract comprising a series of words generated by selecting a nominal item and expanding the abstract by iteratively applying at least one of a set of rules comprising:
      i. to a nominal item, add a descriptor describing the nominal item;
      ii. to a nominal item, add a connector item and another nominal item, connector items specifying relationships between at least two nominal items;
      iii. to a nominal item, add a logical connector and another nominal item, logical connectors establishing sets of nominal items; and
      iv. to a descriptor item, add a logical connector and another descriptor item;
   b. means for receiving a user query comprising a series of words;
   c. means for applying the query to the document abstracts to identify word matches therebetween;
   d. means for (i) identifying stored documents having abstracts with words matching at least some of the words of the query, and (ii) based on the word matches, ranking the identified documents in an order relevance, the order favoring documents having abstracts with terms literally matching the query.

16. The apparatus of claim 15 further comprising databases of nominal, connector, descriptor and logical-connector items, the words of the abstract being selected from the databases.

17. The apparatus of claim 16 wherein the words of the user query are also selected from the databases.

18. The apparatus of claim 16 wherein the logical-connector database comprises the entries and, or.

19. The apparatus of claim 15 wherein the documents comprise viewable and non-viewable portions, the abstracts being contained in the non-viewable portions.

20. The apparatus of claim 15 further comprising means for facilitating user retrieval of the identified documents.

21. The apparatus of claim 15 wherein the nominal items name a person, place, thing, activity or idea.

22. The apparatus of claim 21 wherein the nominal items include the terms set forth in Appendix 1.

23. The apparatus of claim 15 wherein the connector items show action, being or state of being.

24. The apparatus of claim 23 wherein the connector items include the terms set forth in Appendix 2.

25. The apparatus of claim 15 wherein the descriptor items describe a quality, quantity, state or type of a nominal entry.

26. The apparatus of claim 25 wherein the descriptor items include the entries set forth in Appendix 3.

* * * * *